US010861059B1

(12) United States Patent
Dearborn et al.

(10) Patent No.: US 10,861,059 B1
(45) Date of Patent: Dec. 8, 2020

(54) SYSTEMS AND METHODS FOR SUPPLYING A VIDEO ADVERTISEMENT TO A PUBLISHER

(71) Applicant: Servemotion, Inc., New York, NY (US)

(72) Inventors: Matthew B. Dearborn, New York, NY (US); David M. Himrod, New York, NY (US); Joseph R. Hirsch, New York, NY (US); C. Hagan Major, New York, NY (US)

(73) Assignee: Servemotion, Inc., New York, NY (US)

( * ) Notice: Subject to any disclaimer, the term of this patent is extended or adjusted under 35 U.S.C. 154(b) by 0 days.

(21) Appl. No.: 15/449,451

(22) Filed: Mar. 3, 2017

(51) Int. Cl.
  *G06Q 30/02* (2012.01)
  *H04L 29/08* (2006.01)

(52) U.S. Cl.
  CPC ......... *G06Q 30/0277* (2013.01); *H04L 67/20* (2013.01)

(58) Field of Classification Search
  CPC .......................... G06Q 30/0277; H04L 67/20
  USPC ........ 705/14.55, 14.66, 14.41, 14.73; 725/32
  See application file for complete search history.

(56) References Cited

U.S. PATENT DOCUMENTS

| 9,462,354 | B2 | 10/2016 | Phan et al. | |
| 2007/0027768 | A1* | 2/2007 | Collins | G06Q 10/0631 705/14.55 |
| 2007/0078715 | A1* | 4/2007 | Murakami | G06Q 30/02 705/14.66 |
| 2008/0201188 | A1* | 8/2008 | Heyman | G06Q 30/02 705/14.41 |
| 2009/0125936 | A1* | 5/2009 | Kulasekaran | H04H 60/06 725/32 |
| 2010/0250361 | A1 | 9/2010 | Torigue et al. | |
| 2012/0047027 | A1* | 2/2012 | Kadambi | G06Q 30/02 705/14.73 |
| 2015/0287102 | A1 | 10/2015 | Gupta et al. | |
| 2015/0310500 | A1 | 10/2015 | Nolet et al. | |
| 2017/0127123 | A1* | 5/2017 | Lidow | H04N 21/4331 |

FOREIGN PATENT DOCUMENTS

WO  WO-2007134109 A2  * 11/2007

OTHER PUBLICATIONS

Thales S. Teixeira, 2015, When People Pay Attention to Video Ads and Why (Year: 2015).*

* cited by examiner

*Primary Examiner* — Tarek Elchanti
(74) *Attorney, Agent, or Firm* — Maynard Cooper & Gale, P.C.; Jon E. Holland (57) ABSTRACT

Systems and methods are provided for supplying a video advertisement to a web page or application. A main ad server provides an ecosystem to network ad servers from different ad networks. The main ad server can collect and store information about each of the campaigns or demand tags associated with each of the network ad servers in a database. The main ad server can then review the database in response to an ad call from a publisher to determine the campaigns or demand tags that correspond to the ad call. Once the campaigns or demand tags that satisfy the ad call have been determined, the main ad server can generate a prioritized list of campaigns or demand tags based on priorities established by the publisher who submitted the ad call. The prioritized list of campaigns can be sequentially processed until a video advertisement is provided to the publisher.

20 Claims, 4 Drawing Sheets

SYSTEMS AND METHODS FOR SUPPLYING A VIDEO ADVERTISEMENT TO A PUBLISHER

BACKGROUND

The present application generally relates to systems and methods for supplying a video advertisement to a publisher.

In the field of on-line advertising, an ad (advertising) network can be used to connect advertisers with publishers (e.g., web sites (or applications) that want to host advertisements on their web sites (or applications)). The ad network can aggregate ad space supply from publishers and then match the ad space supply with advertiser demand for the ad space. Many ad networks arbitrage ad space by buying ad space, and then reselling the ad space to another partner (e.g., another ad network, an ad agency, etc.) rather than providing an ad (advertisement) for the ad space. Often times, multiple ad networks can arbitrage a single ad space before an ad can be provided to the ad space. The arbitraging of ad space can result in a long process involving ad calls to a sequence of ad servers (used by the corresponding ad networks) before the actual ad is obtained for the ad space. The sequence of ad calls requesting an ad for the ad space can be referred to as a call chain. A response to an ad call can include a demand tag with either the ad (or creative) itself or another ad call to contact another ad server to determine if that ad server has the ad, which results in another step in the sequence or "link" in the chain. The process of navigating a call chain and calling multiple ad servers in order to obtain an ad can result in a significant delay before the ad is available to the ad space and can result in a substantial load on a browser attempting to display a web site with an ad space.

In addition, when an ad network is navigating a call chain to obtain an ad, the ad network can traffic a demand tag returned from another ad network into the originating ad network's waterfall associated the original ad call. A waterfall for an ad call is a list of demand tags (or campaigns) that satisfy the requirements of the ad call. The ad network progresses sequentially through the demand tags of the waterfall until an ad is returned. The returned demand tag from another ad network in response to an ad call in a demand tag of the waterfall can have an aggregate fill rate (i.e., the likelihood that an ad is provided for the ad space), and be positioned in the waterfall based on the aggregate fill rate. However, most demand tags can include ad calls to several demand sources (at corresponding ad servers), where each of the demand sources can have different fill rates, some that are higher and some that are lower than the aggregate fill rate. The performance of the original ad call (also referred to as a supply tag), from a revenue perspective, is not optimal because all of the demand sources of a returned demand tag are stuck in the same position of the waterfall as the demand tag and a less optimal ad may be selected for the ad space over a more optimal ad as a result of the less optimal ad being acquired first.

SUMMARY

The present application generally pertains to systems and methods for supplying a video advertisement to a publisher. A main ad server is provided that incorporates a plurality of network ad servers from different ad networks. The main ad server provides a common ecosystem for the network ad servers such that communication between the corresponding network ad servers is simplified (e.g., communication protocol information does not have to be exchanged). In addition, the main ad server can also collect and store information in an ad database about each of the campaigns or demand tags associated with each of the network ad servers that are included within the main ad server. When an ad call is made from a publisher to one of the network ad servers, the main ad server can process the ad call and review the ad database to determine the campaigns or demand tags from the network ad servers that satisfy the requirements of the ad call without having to sequentially process individual ad calls to network ad servers identified within one or more demand tags. Once the campaigns or demand tags that satisfy the ad call have been determined, the main ad server can generate a prioritized list of campaigns or demand tags based on priorities established by the publisher who submitted the ad call. The prioritized list of demand tags can then be sequentially processed until a video advertisement is provided to the publisher. If a demand tag in the priority list calls a third party ad server, i.e., an ad server that is not included in the main ad server, the main ad server can submit an ad call to the third party ad server and receive a demand tag from the third party ad server.

One advantage of the present application is that it reduces the latency period before a video ad is provided to a user device by reducing the number of steps (or hops) in the process.

Another advantage of the present application is that less ad calls are made from the user's browser.

Still another advantage of the present application is that it is less resource intensive on ad servers by reducing the processing bandwidth consumed by the ad server and by reducing the data aggregation bandwidth consumed by the ad server.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
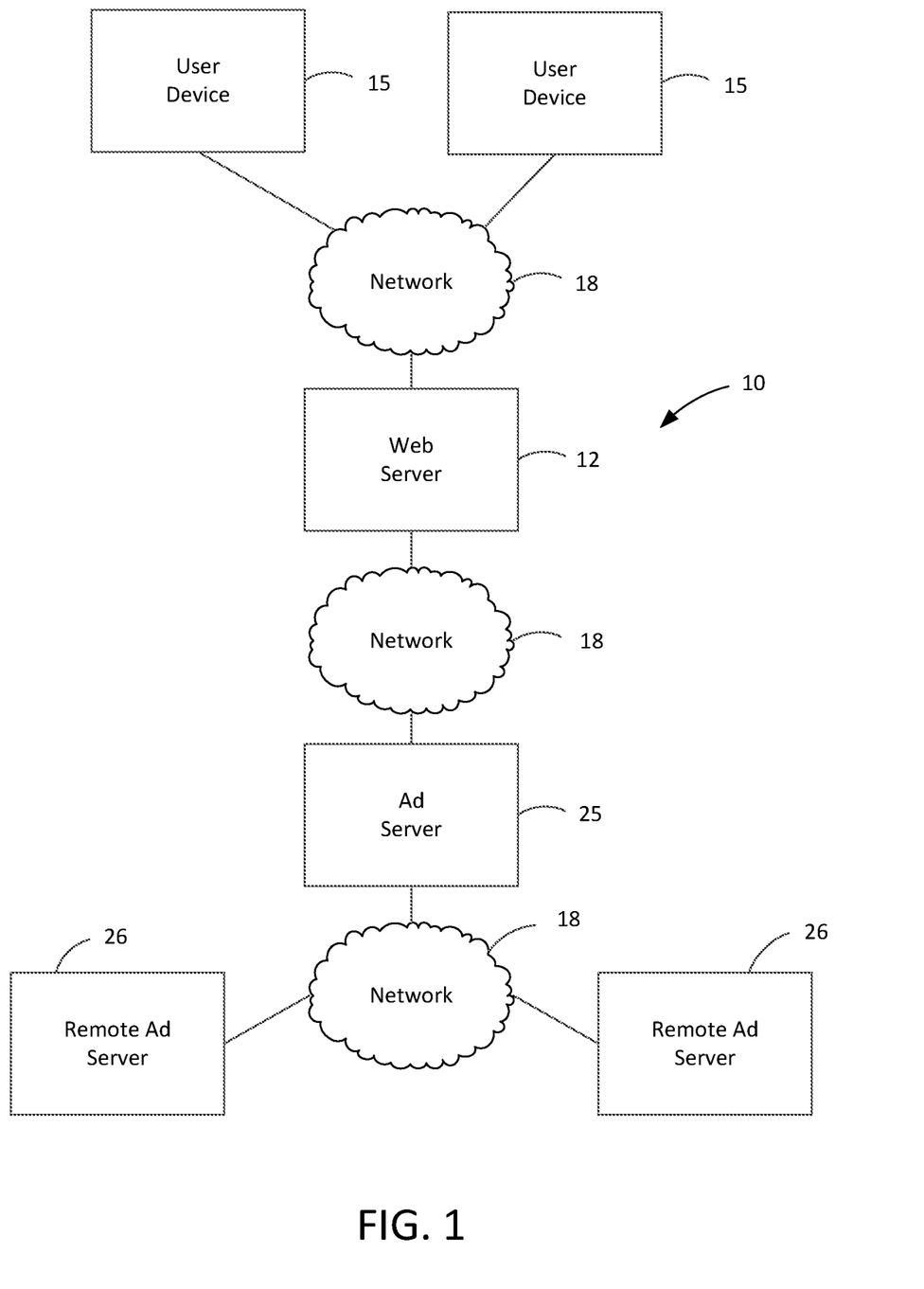
FIG. 1 is a block diagram showing an embodiment of a video advertising system.

FIG. 1 shows an embodiment of a video advertising system 10. The system 10 includes a web server 12 for hosting a website, a mobile application and/or a connected system which can be accessed by one or more user devices 15 over a network 18. Each user device 15 is communicatively coupled to the network 18 and may be any device capable of exchanging, i.e., sending and receiving, instructions, data and/or information with the web server 12. The user device 15 can be, but is not limited to, a desktop, laptop or tablet computer, a hand-held device, such as a cellular telephone (e.g., a smartphone) or portable gaming device, a television, a video game system, a still and/or video camera, and/or an attachable, wearable, implantable or non-invasive computer or device. The user device 15 can have one or more input devices to permit a user to enter instructions, data and/or information for the web server 12 and one or more output devices to permit the user to display instructions, data and/or information received from the web server 12. In one embodiment, the user device 15 can include a touch screen interface that can both display content received from the web server 12 and receive touch inputs from the user for the web server 12.

The network 18 can be the Internet and use the transmission control protocol/Internet protocol (TCP/IP) for communication in an embodiment. However, in other embodiments, the network 18 may be an Intranet, a local area network (LAN), a wide area network (WAN), a Near Field Communication (NFC) network, or any other type of communication network using one or more communication protocols.

Figure 2:
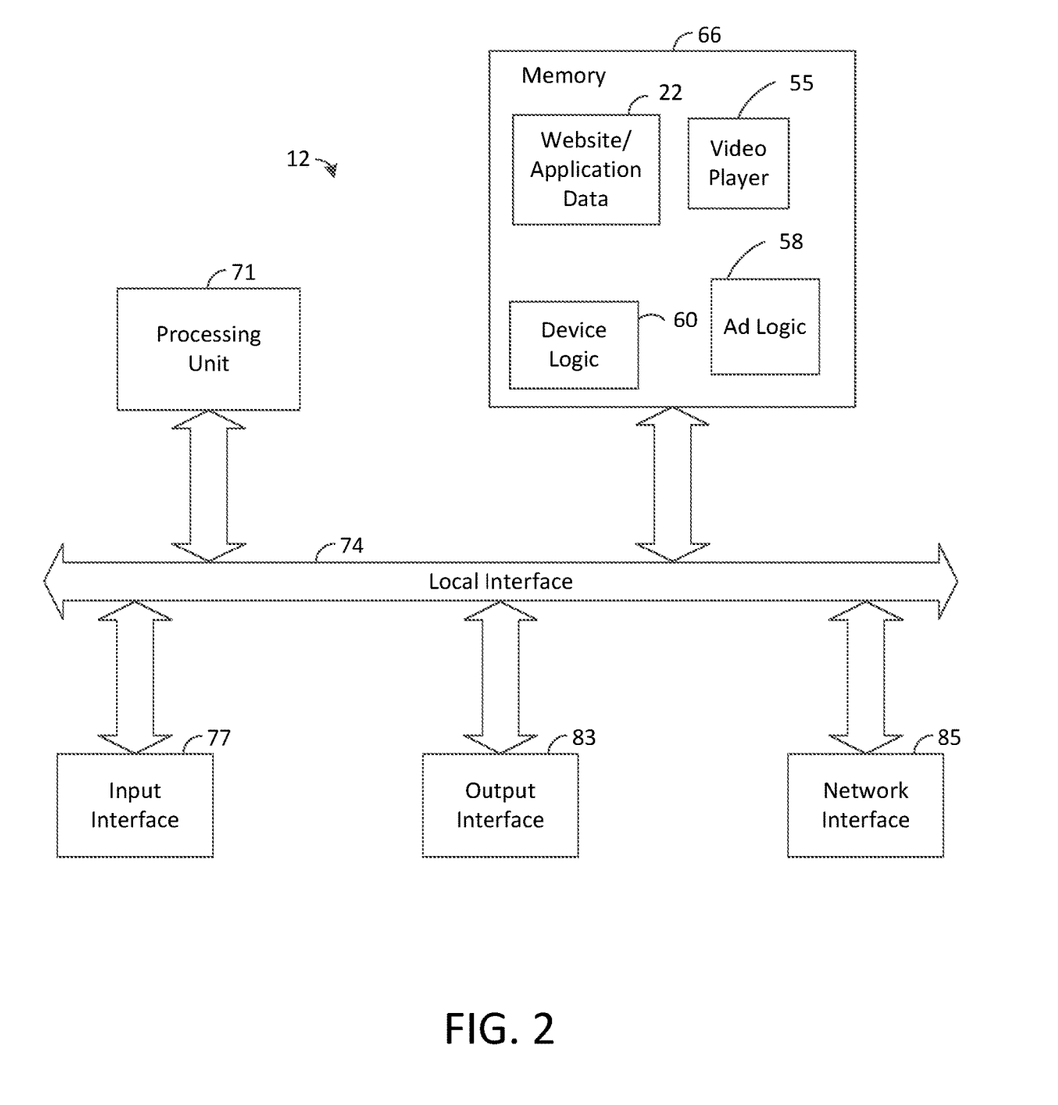
FIG. 2 is a block diagram showing an embodiment of a web server.

FIG. 2 shows an embodiment of the web server 12. The web server 12 may be implemented as one or more general or special-purpose computers, such as a laptop, hand-held (e.g., smartphone), desktop, or mainframe computer. The web server 12 can include logic 60, referred to herein as "device logic," for generally controlling the operation of the web server 12, including communicating with the user devices 15 and ad server 25 (see FIG. 1) of the advertising system 10. The web server 12 also includes logic 55, referred to herein as a "video player," to display videos in one or more web pages (or applications) on the user device 15 and ad logic 58 to control the requesting and displaying of ads (e.g., video ads) in one or more web pages (or applications). The device logic 60, ad logic 58 and the video player 55 can be implemented in software, hardware, firmware or any combination thereof. In the web server 12 shown in FIG. 2, the device logic 60, ad logic 58 and the video player 55 are implemented in software and stored in memory 66 of the web server 12. Note that the device logic 60, ad logic 58 and the video player 55, when implemented in software, can be stored and transported on any non-transitory computer-readable medium for use by or in connection with an instruction execution apparatus, e.g., a microprocessor, that can fetch and execute instructions. In the context of this application, a "computer-readable medium" can be any device, system or technique that can contain or store a computer program for use by or in connection with an instruction execution apparatus.

The web server 12 includes at least one conventional processing unit 71, such as at least one digital signal processor or central processing unit (CPU), that communicates to and drives the other elements within the web server 12 via a local interface 74, which can include at least one bus. Furthermore, an input interface 77, for example, a keyboard, a mouse, touchscreen, sensor or any other interface device or apparatus, can be used to input data from a user of the web server 12, and an output interface 83, for example, a printer, monitor, liquid crystal display (LCD), or other display apparatus, can be used to output data to the user of the web server 12. Further, a network interface 85, such as at least one modem, may be used to communicate data over the network 18.

The web server 12 can, for example, store in memory 66 website/application data 22 that defines a website and/or application that can be accessed by any of the user devices 15. If the web server 12 is communicating with an application on the user device 15, then the website/application data 22 would also include data used by the application. In addition, the website/application data 22 may include one or more webpages that can be retrieved and rendered by a web browser on the user device 15. In one embodiment, one of the webpages or applications included within the website/application data 22 can embed video player 55 in the web page or application and use the video player 55 to display one or more videos on the user device 15 for viewing by the user. The videos displayed by the webpage (or application) can include informational videos, entertainment videos, advertising videos (e.g., video advertisements), and/or other types of videos. Advertising videos can be displayed either before, after or during (or combinations thereof), the displaying of an informational video or an entertainment video. Alternatively, the advertising video can be displayed independently on the webpage (or application) without being associated with an informational video or entertaining video.

When the ad logic 58 determines that an advertising video should be displayed on a webpage (or application), the ad logic 58 sends a request for an ad (ad call) to the ad server 25 or sends a request to the video player 55, which then sends the request to the ad server 25. The ad server 25 can respond to the request with a video (or a creative) to be displayed on the web page (or application). The web server 12 can communicate with the ad server 25 over the network 18 to receive the advertising video to be displayed on the webpage (or application) as discussed in detail below.

In one embodiment, the ad logic 58 can be partially or entirely incorporated into the video player 55 and/or into the website/application data 22 for a website or application. In another embodiment, the web browser of the user device 15 can make a request to the ad server 25 for the ad when the ad logic 58 has been incorporated into the website data 22. In other embodiments, the video player 55 may be provided by a third party and accessed over network 18 by the web server 12.

Figure 3:
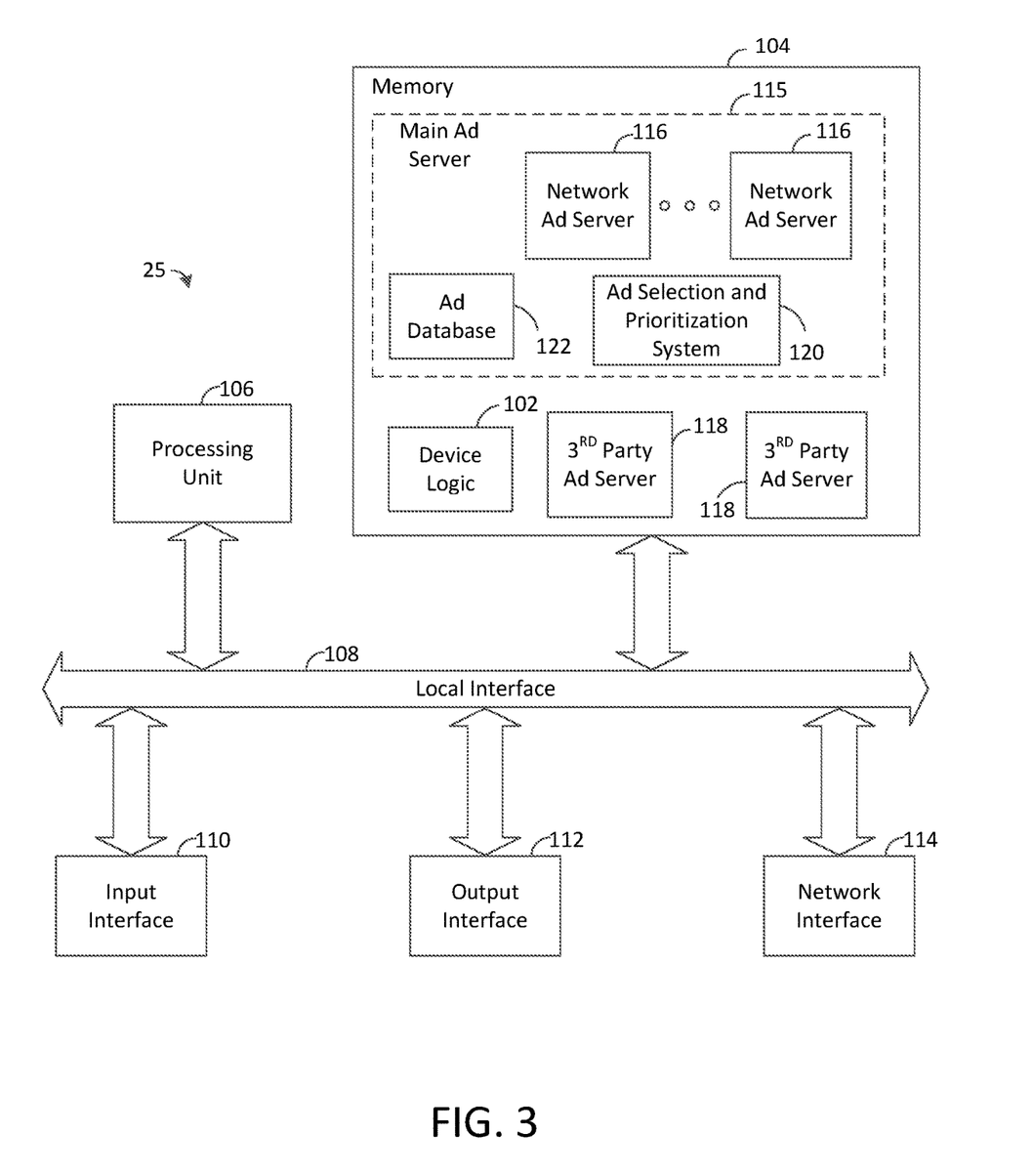
FIG. 3 is a block diagram showing an embodiment of an ad server.

FIG. 3 shows an embodiment of the ad server 25. The ad server 25 may be implemented as one or more general or special-purpose computers, such as a laptop, hand-held (e.g., smartphone), desktop, or mainframe computer. The ad server 25 can include logic 102, referred to herein as "device logic," for generally controlling the operation of the ad server 25, including communicating with the web server 12 and other remote ad servers 26 (see FIG. 1) of the advertising system 10. The ad server 25 also includes logic 116, referred to herein as a "network ad server," to review and process ad calls for an ad network, and logic 115, referred to herein as a "main ad server," to provide an ecosystem or infrastructure for the interaction between the network ad servers 116 and the operation of the network ad servers 116. The ad server 25 can further include logic 118, referred to herein as a "$3^{rd}$ party ad server," to review and process ad calls for an ad network that is not included within the main ad server 115. The main ad server 115 can also include an ad selection and prioritization system 120 that selects the demand tags (which are used to access the ads (videos)) from an ad database 122 that satisfy the requirements (also referred to as targeting information or selection criteria) of an ad call received by one of the network ad servers 116. Once the ad selection and prioritization system 120 has obtained the demand tags satisfying the ad call requirements, the system 120 can then prioritize the demand tags such that the better performing demand tags (e.g., demand tags for ads that generate the most revenue) are provided in response to the ad call over lower performing demand tags (e.g., demand tags for ads that generate less revenue).

The device logic 102, the main ad server logic 115, the network ad server logic 116, the $3^{rd}$ party ad server logic 118 and the ad selection and prioritization system 120 can be implemented in software, hardware, firmware or any combination thereof. In the ad server 25 shown in FIG. 3, the device logic 102, the main ad server logic 115, the network ad server logic 116, the $3^{rd}$ party ad server logic 118 and the ad selection and prioritization system 120 are implemented in software and stored in memory 104 of the ad server 25. Note that the device logic 102, the main ad server logic 115, the network ad server logic 116, the $3^{rd}$ party ad server logic 118 and the ad selection and prioritization system 120, when implemented in software, can be stored and transported on any non-transitory computer-readable medium for use by or in connection with an instruction execution apparatus, e.g., a microprocessor, that can fetch and execute instructions.

The ad server 25 includes at least one conventional processing unit 106, such as at least one of a digital signal processor or central processing unit (CPU), that communicates to and drives the other elements within the ad server 25 via a local interface 108, which can include at least one bus. Furthermore, an input interface 110, for example, a keyboard, a mouse, touchscreen, sensor or any other interface device or apparatus, can be used to input data from a user of the ad server 25, and an output interface 112, for example, a printer, monitor, liquid crystal display (LCD), or other display apparatus, can be used to output data to the user of the ad server 25. Further, a network interface 114, such as at least one modem, may be used to communicate data over the network 18.

The main ad server 115 can provide an ecosystem or environment to simplify the interactions between a network ad server 116 and the web server 12 and between the network ad server 116 and another network ad server 116 of the main ad server 115. In one embodiment, the main ad server 116 can provide an environment such that communication between the network ad servers 116 is simplified. For example, communication protocol information or tags do not have to be exchanged by network ad servers 116 when communicating with each other because the network ad servers 116 are trusted and operating within the controlled environment of the main ad server 115. The simplification of communication between network ad servers 116 can expedite the process of stepping through a call chain in response to an ad call as described below.

The ad server 25 can, for example, store in memory 104 the ad database 122 that includes information on each of the ads (e.g., advertising videos and other forms of advertisements) or campaigns (i.e., a group of ads sharing a single theme) provided by the ad networks associated with the network ad servers 116. For each ad or campaign, the ad database 122 can store information in a table or record regarding the demand tag(s) associated with the ad or campaign. For example, if a campaign included 5 ads, the ad database 122 can store a demand tag for each of the ads, thereby storing 5 demand tags.

For each demand tag, the actual advertising video (or a link to the advertising video) or an ad call to an ad server (e.g., network ad server 116, $3^{rd}$ party ad server 118 or remote ad server 26) is included in the table or record in the ad database 122 as part of the demand tag. Since the ad database 122 has information on the ad calls associated with the demand tags, the ad database 122 can include information regarding an end tag that identifies the end of the call chain associated with each ad call in the table or record associated with the demand tag.

In one embodiment, for a demand tag having an ad call to another ad server (instead of an advertising video), the main ad server 115 or the ad selection and prioritization system 120 can check the ad database 122 for the ad server called in the ad call. If the ad server is a network ad server 116 of the main ad server 115, the main ad server 115 or the ad selection and prioritization system 120 can then review the ad database 122 for campaigns or ads of that network ad server 116 that satisfies the requirements of the ad call in the demand tag. The process of checking the ad database 122 for network ad servers 116 and corresponding campaigns or ads of the network ad servers 116 can be repeated by the main ad server 115 or the ad selection and prioritization system 120 for each newly identified demand tag with an ad call until the advertising video (or a link to the advertising video) is identified or the ad call is to the $3^{rd}$ party ad server 118 or the remote ad server 26. The main ad server 115 or the ad selection and prioritization system 120 can then store the information about the end of the call chain for the demand tag in the ad database 122 in the corresponding end tag for the demand tag. The information in the end tag about the end of the call chain for each demand tag can include an advertising video (or a link to the advertising video) or an ad call to a $3^{rd}$ party ad server 118 or a remote ad server 26. When a demand tag with an ad call is selected in response to an ad call, the ad selection and prioritization system 120 can proceed directly to the end tag (since it is stored in ad database 122) to reach the end of the call chain without having to progress through the call chain.

In one embodiment, the table or record in the ad database 122 associated with the demand tag can include a pre-assigned priority for the demand tag based on factors specified by the publisher (e.g., the web server 12) requesting an ad by submitting an ad call to the ad server 25. The prioritized demand tags can then be assembled into an ordered list in the ad database 122 based on their pre-assigned priorities. In one embodiment, the demand tags can be ordered based on the network ad server 116 to which the demand tags are associated. However, in other embodiments, the demand tags can be ordered with respect to the main ad server 115 (i.e., the demand tags for all of the network ad servers 116 are ordered). As part of the selection process by the ad selection and prioritization system 120, the ordered list of demand tags in the ad database 122 can be filtered based on the targeting information or selection criteria included with an ad call such that the resulting filtered list of demand tags are already in a prioritized order when responding to the ad call. In an embodiment, the priorities assigned to the demand tags in the ad database 122 can be periodically updated to reflect new priorities for the demand tags as established by the publisher.

Figure 4:
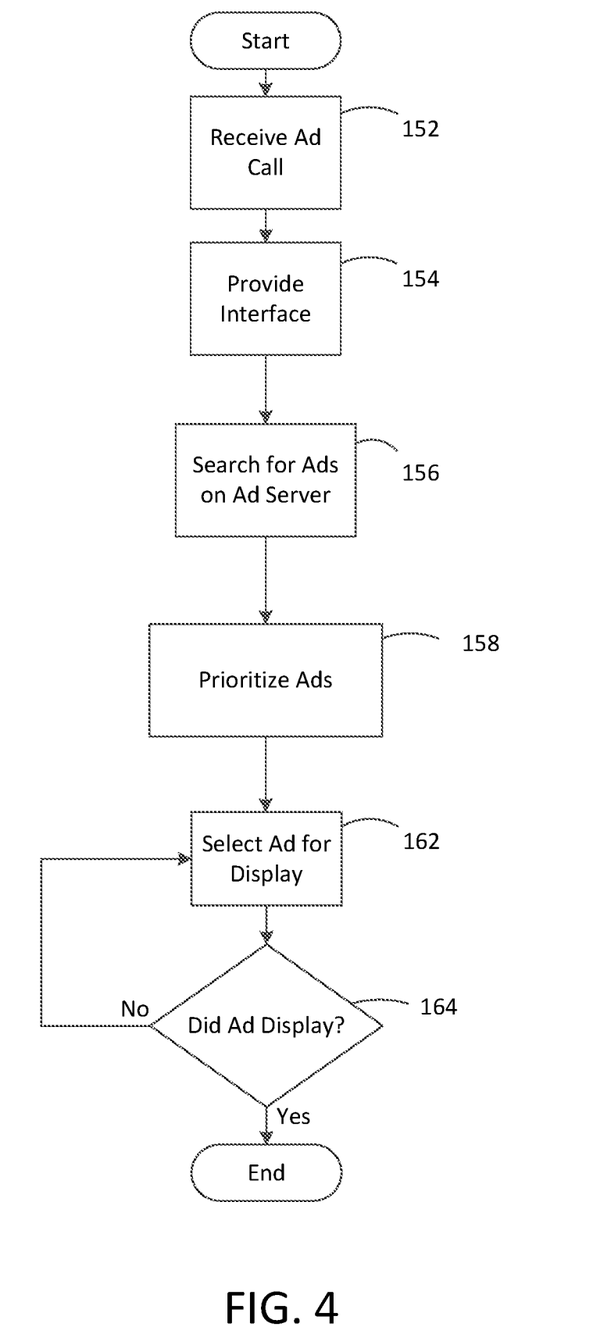
FIG. 4 shows an embodiment of a process for providing a video advertisement to a publisher.

FIG. 4 shows an embodiment of a process for providing a video advertisement to a web page or application. The process begins with the ad server 25 receiving an ad call (step 152). The ad server 25 can receive the ad call from ad logic 58 associated with a publisher (e.g., the web server 12, the video player 55 or the web page or application). The ad server 25 then routes the ad call to the corresponding ad server (e.g., network ad server 116) associated with the ad network included in the ad call. In one embodiment, the main ad server 115 can process the ad calls on behalf of the network ad servers 116. In another embodiment, the main ad server 115 can be the corresponding ad server for the ad network identified in the ad call. When the main ad server logic 115 receives an ad call, the main ad server logic 115 can provide an interface (step 154) to the source of the ad call (e.g., web server 12, video player 55 or the web page or application). The interface is used to standardize communications between the ad server 25 and the source of the ad call. The interface is used at both the ad server 25 and the source of the ad call and enables the ad server 25 to control the video player 55. In one embodiment, the interface can be VPAID (Video Player Ad-serving Interface Definition) that enables the ad network and the advertiser to collect playback and user-interaction details on a played video advertisement. In other embodiments, the interface can use VAST (Video Ad-Serving Template), MRAID (Mobile Rich media Ad Interface Definition) or SafeFrame. In alternate embodiment, the ad server 25 (or main ad server 115) can decide not to respond to the ad call received in step 152 and the process can end.

In response to receiving the interface from the main ad server logic 115, the source of the ad call can submit a request or ad call via the interface to the main ad logic 115. When the main ad server logic 115 receives the request or ad call through the interface, the main ad server logic 115 can have the ad selection and prioritization system 120 initiate a search of the ad database 122 for demand tags that satisfy the requirements in the ad call (step 156). The ad selection and prioritization system 120 can search the ad database 122 to determine if one or more of the network ad servers 116 has one or more demand tags, which correspond to advertising videos or paths to advertising videos, that satisfy the requirements in the ad call. In one embodiment, the demand tags can be selected based on targeting or selection criteria included with the ad call. The targeting or selection criteria used to select (or filter) the demand tags can include factors such as geolocation, user cookies, and/or the number of views of a particular advertising video for a demand tag.

Once the ad selection and prioritization system 120 has identified the demand tags that satisfy the ad call, the ad selection and prioritization system 120 can order the demand tags (step 158) based on priority criteria established by the publisher. In one embodiment, as described above, the demand tags for a network ad server 116 are organized into a prioritized list in ad database 122, thereby providing a pre-prioritized list of the results satisfying the ad call. In another embodiment, the ad selection and prioritization system 120 can generate a random list of demand tags satisfying the ad call and then prioritize the demand tags based on criteria established by the publisher and/or by the ad server 25.

In one embodiment, the demand tags can be prioritized based on factors such as the fill rate for the ad (the percentage of time an advertising video is returned to the video player 55), the response time (the time to get the advertising video to the video player 55), the revenue from the ad and combinations thereof. In other embodiments, other criteria such as CPM (cost per thousand impressions) can be used to prioritize the returned ads. In one embodiment, the information on the criteria (e.g., fill rate, response time and revenue) can be provided by the corresponding advertiser who generated the ad.

The prioritized ads can then be selected by the main ad server logic 115 for display on the video player 55 of the web page or application (step 162) using the interface. The main ad server logic 115 can use the end of the call chain information in the end tag for the selected demand tag in ad database 122 in order to more quickly access the advertising video. In one embodiment, the main ad server logic 115 can select the demand tag with the highest priority for display, but may select other demand tags in other embodiments. The main ad server logic 115 can then determine whether the advertising video for the selected demand tag was displayed by the video player 55 for the web page or application (step 164). If the advertising video was displayed, then the process ends, but if the advertising video wasn't returned and/or displayed, the main ad server logic 115 can then return to step 162 and select a new demand tag and associated advertising video for display.

Embodiments within the scope of the present application include program products with machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions include, for example, instructions and data which cause a general purpose computer, special purpose computer, or special purpose processing machine to perform a certain function or group of functions. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A computer implemented method of obtaining an advertisement for a user device, the method comprising:
   storing advertisement data for each advertisement of a plurality of advertisements in a memory device of a main ad server, the plurality of advertisements being provided by a plurality of network ad servers incorporated within the main ad server, each network ad server of the plurality of network ad servers corresponding to an ad network providing at least one advertisement, the advertisement data including, for each advertisement of the plurality of advertisements, a demand tag including an initial ad call, the initial ad call configured to initiate a sequence of ad calls to one or more network ad servers of the plurality of network ad servers in order to access the advertisement;
   generating an end tag for each advertisement of the plurality of advertisements, wherein each generated end tag is stored in the advertisement data and includes a final ad call at an end of the sequence of the ad calls, the final ad call including information regarding accessing the corresponding advertisement from a first network ad server of the plurality of network ad servers;

receiving, at a second network ad server of the plurality of network ad servers, a request for an advertisement from a publisher, wherein the request includes at least one selection criteria;

identifying, by the main ad server, at least one demand tag corresponding to at least one advertisement in the advertisement data associated with the second network ad server receiving the request and complying with the at least one selection criteria;

ordering, by the main ad server, the identified at least one demand tag corresponding to the at least one advertisement into a list based on a priority level stored in the advertisement data for each advertisement corresponding to each identified demand tag;

selecting a demand tag corresponding to an advertisement from the ordered list;

identifying an end tag in the advertisement data for the advertisement corresponding to the selected demand tag; and providing, by the main ad server, the advertisement corresponding to the selected demand tag from the ordered list to a video player associated with the publisher using the final ad call from the identified end tag, wherein the video player is configured to display the advertisement on a user device.

2. The method of claim 1, further comprising determining, by the main ad server, whether the provided advertisement was displayed by the video player.

3. The method of claim 2, further comprising:
selecting an additional demand tag corresponding to an additional advertisement from the ordered list in response to a determination that the provided advertisement was not displayed by the video player;

identifying an additional end tag in the advertisement data for the additional advertisement corresponding to the selected additional demand tag; and providing, by the main ad server, the additional advertisement corresponding to the selected additional demand tag from the ordered list to the video player associated with the publisher using the final ad call from the identified additional end tag.

4. The method of claim 1, further comprising determining the priority level of each advertisement of the plurality of advertisements in the advertisement data, wherein the priority level is established based on information provided by the publisher.

5. The method of claim 1, wherein the initial ad call included in the demand tag includes a call to a third network ad server of the plurality of network ad servers, and wherein the method further comprises searching the advertisement data of the memory device associated with the third network ad server for at least one additional demand tag, the at least one additional demand tag being used to determine the end tag.

6. The method of claim 5, wherein the searching the advertisement data occurs prior to the receiving a request for an advertisement.

7. The method of claim 1, wherein:
the final ad call included in the end tag includes a call to a third party ad server, the third party ad server being independent of the main ad server; and
the providing the advertisement includes accessing the at least one identified advertisement at the third party ad server with the final ad call.

8. An advertising server to obtain advertisements for distribution to publishers over a network, the advertising server comprising:

a main ad server, the main ad server comprising:
a plurality of network ad servers, each network ad server of the plurality of network ad servers including at least one video advertisement;

an ad database storing information relating to each video advertisement of a plurality of video advertisements provided by the plurality of network ad servers, the plurality of video advertisements including the at least one video advertisement from each network ad server of the plurality of network ad servers, the ad database including, for each video advertisement of the plurality of video advertisements, a demand tag including an initial ad call, the initial ad call configured to initiate a sequence of ad calls to one or more network ad servers of the plurality of network ad servers in order to access the video advertisement; and an end tag for each video advertisement of the plurality of video advertisements, wherein each end tag is stored in the ad database and includes a final ad call at an end of the sequence of the ad calls, the final ad call including information regarding accessing the corresponding video advertisement from a first network ad server of the plurality of network ad servers; and wherein the main ad server is configured to enable communication between the plurality of network ad servers without the plurality of network ad servers having to exchange protocol information;

a third party ad server in communication with the main ad server, the third party ad server including at least one video advertisement;

a processing unit coupled to the main ad server and configured to execute instructions; and a memory having the instructions stored thereon and coupled to the processing unit to provide the instructions to the processing unit, wherein the instructions cause the processing unit to:

receive a request for a video advertisement from a publisher, wherein the request is directed to a second network ad server of the plurality of network ad servers;

identify at least one demand tag corresponding to at least one video advertisement in the ad database associated with the second network ad server in response to receiving the request;

select a demand tag of the identified at least one demand taq corresponding to a video advertisement;

identify an end tag in the ad database for the video advertisement corresponding to the selected demand tag; and provide the video advertisement corresponding to the selected demand tag to a video player associated with the publisher using the final ad call from the identified end tag, wherein the video player is configured to display the identified video advertisement.

9. The advertising server of claim 8, wherein the instructions cause the processing unit to determine whether the provided video advertisement was displayed by the video player.

10. The advertising server of claim 9, wherein the instructions cause the processing unit to:
select an additional demand tag corresponding to an additional video advertisement in response to a determination that the provided video advertisement was not displayed by the video player;

identify an additional end tag in the ad database for the additional video advertisement corresponding to the selected additional demand tag; and provide the additional video advertisement corresponding to the selected additional demand tag to the video player associated with the publisher using the final ad call from the identified additional end tag.

11. The advertising server of claim 8, wherein the instructions cause the processing unit to order the identified at least one demand tag corresponding to the at least one video advertisement into a list based on a priority level assigned to each video advertisement.

12. The advertising server of claim 11, wherein the priority level is established based on information provided by the publisher.

13. The advertising server of claim 11, wherein each demand tag corresponding to a video advertisement is arranged in the ad database based on a corresponding priority level for the video advertisement and the list is ordered based on the arrangement of demand tags in the ad database.

14. The advertising server of claim 8, wherein:
the initial ad call included in the demand tag includes a call to a third network ad server of the plurality of network ad servers; and
the instructions cause the processing unit to search the ad database for at least one additional demand tag associated with the third network ad server, wherein the at least one additional demand tag being used to determine the end tag.

15. The advertising server of claim 14, wherein the searching of the ad database occurs prior to the receiving a request for an advertisement.

16. A video advertisement system, the system comprising:
a server in communication with a user device, the server comprising a video player, the video player configured to display a video advertisement on the user device;
a first ad server coupled to the server via a network, the first ad server comprising:
a plurality of second ad servers, each second ad server of the plurality of second ad servers corresponding to an ad network and including at least one video advertisement;
an ad database storing information relating to the video advertisements, the information including, for each video advertisement,
a demand tag including an initial ad call, the initial ad call configured to initiate a sequence of ad calls to one or more second ad servers of the plurality of second ad servers in order to access the video advertisement; and
an end tag for each video advertisement, wherein each end tag is stored in the ad database and includes a final ad call at an end of the sequence of the ad calls, the final ad call including information regarding accessing the corresponding video advertisement from a second ad server of the plurality of second ad servers and a priority level; and
wherein the first ad server is configured to enable communication between the plurality of second ad servers without the plurality of second ad servers having to exchange protocol information;
a processing unit coupled to the first ad server and configured to execute instructions; and
a memory having the instructions stored thereon and coupled to the processing unit to provide the instructions to the processing unit, wherein the instructions cause the processing unit to:
receive a request for a video advertisement from the server, wherein the request identifies a second ad server and includes at least one selection criteria;
identify a plurality of demand tags corresponding to a plurality of video advertisements in the ad database associated with the second ad server in response to the received request, wherein the identified plurality of demand tags satisfies the at least one selection criteria;
select a demand tag of the identified plurality of demand tags corresponding to a video advertisement of the plurality of identified video advertisements based on a priority level assigned to the video advertisement in the ad database;
identify an end tag in the ad database for the video advertisement corresponding to the selected demand tag; and
obtain the video advertisement associated with the selected demand tag for the video player for display on the user device using the final ad call from the identified end tag.

17. The system of claim 16, wherein the selected demand tag has a greater priority level than other remaining demand tags of the identified plurality of demand tags.

18. The system of claim 16, wherein the initial ad call in the demand tag for the video advertisement includes a call to a remaining second ad server of the plurality of second ad servers, wherein the instructions cause the processing unit to submit a request for a video advertisement to the remaining second ad server in response to the demand tag having the initial ad call to the remaining second ad server.

19. The system of claim 16, wherein the final ad call in the end tag includes a call to a third ad server, the third ad server being independent of the first ad server and the plurality of second ad servers, and wherein the instructions cause the processing unit to call the third ad server in order to obtain the video advertisement.

20. The system of claim 19, wherein the end tag for the selected demand tag corresponding to a video advertisement is determined prior to the request for the video advertisement from the server.

* * * * *